(12) United States Patent
Miller et al.

(10) Patent No.: US 8,260,692 B1
(45) Date of Patent: Sep. 4, 2012

(54) ONLINE SAFETY DEPOSIT BOX INVENTORY SYSTEM

(75) Inventors: Eric W. Miller, Issaquah, WA (US); Aaron D. Lewis, Issaquah, WA (US); Brian R. Jones, Seattle, WA (US)

(73) Assignee: Bank of America Corporation, Charlotte, NC (US)

( * ) Notice: Subject to any disclaimer, the term of this patent is extended or adjusted under 35 U.S.C. 154(b) by 364 days.

(21) Appl. No.: 12/349,745

(22) Filed: Jan. 7, 2009

(51) Int. Cl.
*G06Q 10/00* (2012.01)
*G06Q 40/00* (2012.01)
*G06Q 20/00* (2012.01)
*G06Q 30/00* (2012.01)
*G06Q 90/00* (2006.01)
*G06F 19/00* (2011.01)
*G07D 11/00* (2006.01)
*G07F 19/00* (2006.01)

(52) U.S. Cl. ............... 705/28; 705/35; 705/42; 705/67; 235/385; 235/379

(58) Field of Classification Search .............. 705/9, 78, 705/28, 35, 1, 67, 4; 17/60; 235/385, 451, 235/379, 383
See application file for complete search history.

(56) References Cited

U.S. PATENT DOCUMENTS

| | | | | |
|---|---|---|---|---|
| 5,712,989 A | * | 1/1998 | Johnson et al. | 705/28 |
| 6,954,753 B1 | * | 10/2005 | Jeran | 1/1 |
| 7,249,709 B2 | * | 7/2007 | Van Rens | 235/451 |
| 7,441,277 B2 | * | 10/2008 | Burges et al. | 726/29 |
| 2002/0046188 A1 | * | 4/2002 | Burges et al. | 705/67 |
| 2002/0059120 A1 | * | 5/2002 | Milton | 705/28 |
| 2003/0115285 A1 | * | 6/2003 | Lee et al. | 709/217 |
| 2003/0126004 A1 | * | 7/2003 | Miller et al. | 705/9 |
| 2004/0024714 A1 | * | 2/2004 | Wells et al. | 705/78 |
| 2004/0093266 A1 | * | 5/2004 | Dohring | 705/14 |
| 2005/0159975 A1 | * | 7/2005 | Wang et al. | 705/1 |
| 2005/0216294 A1 | * | 9/2005 | Labow | 705/1 |
| 2006/0193004 A1 | | 8/2006 | Wasilewski et al. | |
| 2007/0100892 A1 | * | 5/2007 | Kephart et al. | 707/200 |
| 2007/0277110 A1 | | 11/2007 | Rogers et al. | |
| 2008/0046349 A1 | * | 2/2008 | Elberg et al. | 705/35 |
| 2008/0215377 A1 | * | 9/2008 | Wottowa et al. | 705/4 |
| 2008/0281730 A1 | * | 11/2008 | Margolis | 705/28 |

* cited by examiner

*Primary Examiner* — Matthew Gart
*Assistant Examiner* — Reva R Danzig
(74) *Attorney, Agent, or Firm* — Michael A. Springs; Moore and Van Allen, PLLC; Padowithz Alce

(57) ABSTRACT

Embodiments of the invention provide systems, methods, and computer program products for an online safety deposit box inventory management system. A customer may securely log into the customer's bank accounts and add or delete safety deposit boxes to a list of safety deposit boxes that the customer owns. The customer may select a box to view and add or delete items that the customer has in the selected box. The customer may also edit the description, type, date, etc. of items that the customer already has listed in the box. In keeping a list of the items that the customer has in each safety deposit box the customer may keep an up-to-date record of the contents of each box for the customer's estate in case the customer passes away or simply in order to have a back up copy in case something happens to a paper copy.

25 Claims, 5 Drawing Sheets

Figure 3

ONLINE SAFETY DEPOSIT BOX INVENTORY SYSTEM

FIELD

This invention relates generally to the field of online personal banking, and more particularly, embodiments of the invention relate to systems, methods, and computer program products for managing the inventory of safety deposit boxes through the customer's online banking relationship with the bank.

BACKGROUND

As known, safety deposit boxes are personal safes for securing valuable items that would be difficult or impossible to replace. As used herein, the phrase "safety deposit box" (also sometimes referred to as a "safe deposit box") generally refers to a physical safe or other strongbox for storing physical items deemed important or valuable by a person controlling the safety deposit box. The safety deposit box is often grouped with other safety deposit boxes and is located within a vault in a bank or other financial institution.

Safety deposit boxes are used for a variety of reasons, including privacy, security, and prevention of loss. Safety deposit boxes allow an owner to store whatever it is he/she wants without anyone else knowing about the contents of the boxes unless the owner so desires. Safety deposit boxes also offer protection from fire, water damage, or unlawful taking. Typically, personal property owners will often keep valuable property in a closet, safe, or file cabinet that is located in a home or an office. These locations only offer a minimal amount of protection from various dangers because anything stored in these locations would still be subject to fire, water damage, or unlawful taking. Items kept in a safety deposit box would be virtually immune to any of these dangers. Additionally, insurance companies will often charge lower rates to insure valuables when they are kept in a safety deposit box because they are less likely to be damaged or stolen.

People use safety deposit boxes for all different types of valuables. Some people store jewels, baseball card collections, or other tangible collectible items, while others store important documents such as insurance polices, family records, deeds, leases, stock, bonds, CD certificates, documentation in the form of pictures for insurance purposes, or other types of contracts. Some safety deposit boxes contain simple nostalgic items that have no value outside of the family such as family photographs or videos, but are nonetheless items that people do not want to risk losing. Whatever items are stored in safety deposit boxes it is clear that the owners of the items want to keep them safe, protect them from damage, and prevent loss of the items.

Despite the advantages of safety deposit boxes there are several issues that can arise if a safety deposit box owner is not careful. For instance, customers often keep a paper inventory of their safety deposit box. These lists can be lost or misplaced, and they can also be destroyed by fire, water, or unlawful taking. Furthermore, customers not may keep or have easy access to any records that they even have a safety deposit box; therefore abandonment is often a legitimate problem with many safety deposit boxes. Abandonment occurs when an owner fails to pay the safety deposit rental payment for a number of months or years and thereafter numerous attempts to notify the owner fail. This often occurs after a safety deposit box owner passes away and the estate is not aware that the deceased owned a safety deposit box. In the case of abandonment, the safety deposit box's contents will be turned over to the State's unclaimed property office. Even though the heirs of the deceased still own the right to the contents of the safety deposit box or the value of contents after they are sold, the heirs often have no idea that the State seized the contents of the box in the first place.

If a record of the inventory of the safety deposit box is not kept, customers must visit their safety deposit boxes frequently to refer to and determine what items are located in the safety deposit box. This is an inconvenience to the customer and requires full time employee support from the banking branches to serve the customer.

BRIEF SUMMARY

Embodiments of the present invention address the above needs and/or achieve other advantages by providing a method, system, computer program product, or a combination of the foregoing for an online safety deposit box inventory management system.

One embodiment of the invention is a system comprising, a computer-readable medium providing computer-readable instructions, a communication device, and a processor operatively coupled to the communication device and the computer-readable medium. The processor is configured to execute the computer-readable instructions to use the communication device to electronically provide information about the contents of a safety deposit box.

In another embodiment of the invention, the processor is configured to execute the computer-readable instructions to receive a request from a customer of a financial institution to electronically access an account maintained by the financial institution. The processor is also configured to execute the computer-readable instructions to provide the customer with information regarding the account and information about the contents of a safety deposit box associated with the account.

In further accord with an embodiment of the invention, the computer-readable medium contains information stored therein about the contents of a plurality of safety deposit boxes.

In another embodiment of the invention, the processor is configured to use the communication device to receive an input. The input received comprises a date, a description of the item deposited in the safety deposit box, or a type of item deposited in the safety deposit box. The processor is further configured to store the input in the computer-readable medium as information about the contents of the safety deposit box.

Another embodiment of the invention is a system comprising a memory system and a processing system operatively coupled to the memory system. The memory system comprises information stored therein about contents of at least one safety deposit box. The processing system is configured to allow a user to view, add, edit, delete, or review information stored in the memory system about the contents of the at least one safety deposit box.

In another embodiment of the invention the information comprises a date, a description of the item deposited in the safety deposit box, or a type of item deposited in the safety deposit box.

In further accord with an embodiment of the invention, a communication system is operatively coupled to a network. The processing system is configured to use the communication system to provide the user with a graphical user interface over the network. The graphical user interface comprises a tool that allows the user to view, add, edit, delete, or review information stored in the memory system about the contents of the at least one safety deposit box.

In yet another embodiment of the invention, the graphical user interface displays a list of items deposited in the at least one safety deposit box.

In another embodiment of the invention, the list comprises a date, a description, and an item type for each item in the list.

In further accord with an embodiment of the invention, the graphical user interface also allows the user to view or manage information related to a user's bank account.

Another embodiment of the invention is a computer program product for a safety deposit box management system, the computer program product comprising a computer-readable medium having computer-readable program code portions embodied therein. The computer-readable program code portions comprise a first executable portion configured for allowing a user to view a list of one or more items deposited in a safety deposit box.

In further accord with an embodiment of the invention, the computer program product comprises a second executable portion configured for receiving and storing information related to contents of a user's safety deposit box.

In another embodiment of the invention, the second executable portion is configured to provide a graphical user interface over a network that allows a user to enter information about the contents of the user's safety deposit box.

In yet another embodiment of the invention, the computer program product comprises an executable portion configured to provide a graphical user interface over a network that allows a user to create a safety deposit box content record and associate it with the user's bank account.

In another embodiment of the invention, the list comprises an item description or a predefined item type for each item in the list of one or more items deposited in a safety deposit box.

In another embodiment of the invention, the computer program product comprises an executable portion configured for allowing the user to use a mobile device to view the list of one or more items deposited in the safety deposit box.

Another embodiment of the invention is a system comprising a memory system, a communication system and a processing system. The memory system is configured to store information about items deposited in safety deposit boxes of a plurality of persons. The communication system is configured to communicate with a device via a network. The processing system is operatively coupled to the communication system and the memory system. The processing system is configured to use the communication system to receive identification information from the device. The processing system is also configured to identify a safety deposit box associated with the received identification information and use the communication system to communicate to the device information about one or more items deposited in the identified safety deposit box.

In another embodiment of the invention, the processing system is configured to use the communication system to provide the device with a graphical user interface that allows a user of the device to view, add, edit, delete, or review information stored in the memory system about the one or more items deposited in the identified safety deposit box.

In further accord with an embodiment of the invention, the processing system is configured to use the communication system to provide a web page displaying the information stored in the memory system about the one or more items deposited in the identified safety deposit box.

In yet another embodiment of the invention, the processing system is configured to use the communication system to receive identification information by receiving a user name and a password from the device via the internet.

In another embodiment of the invention, the processing system is configured to use the communication system to receive identification information by providing the device with an online banking portal. Then the processing system receives login information from the device, the login information allows the device to access the bank account information through the online banking portal. The identification information comprises the login information, and the processing system is configured to communicate the information about the one or more items deposited in the identified safety deposit box via the online banking portal.

In yet another embodiment of the invention, the information about one or more items deposited in the identified safety deposit box comprises a date that an item in the safety deposit box was added, a description of an item in the safety deposit box, or a type of an item in the safety deposit box.

Another embodiment of the invention is a method implemented by a computerized system configured to manage information about a plurality of safety deposit boxes. The method comprises receiving identification information from a user electronically via a network. The method then comprises retrieving information stored in a memory device about contents of a safety deposit box associated with the identification information. The method also comprises electronically communicating to the user the information about the contents of the safety deposit box associated with the identification information.

In another embodiment of the invention, electronically communicating to the user the information about the contents of the safety deposit box comprises providing a web page displaying the information about the contents of the safety deposit box.

In further accord with an embodiment of the invention, receiving identification information from a user via a network comprises receiving a user name and a password via the internet.

In yet another embodiment of the invention, receiving identification information from a user via a network comprises providing the user with an online banking portal. The method further comprises receiving login information from the user. The login information allows the user to access the user's bank account information through the online banking portal. The identification information comprises the login information. Also, electronically communicating to the user of the information about the contents of the safety deposit box associated with the identification information comprises providing the information about the contents of the safety deposit box to the user via the online banking portal.

In another embodiment of the invention, the method comprises receiving a request from the user to add information about a new item to the information about the contents of the safety deposit box. The method also comprises storing the information about the new item in the memory device.

In yet another embodiment of the invention, the method comprises receiving a request from the user to edit or delete information from the information about the contents of the safety deposit box. The method further comprises storing a history of deleted or edited information in the memory device.

In further accord with an embodiment of the invention, the information about the contents of the safety deposit box comprises a date that an item in the safety deposit box was added, a description of an item in the safety deposit box, or a type of an item in the safety deposit box.

The features, functions, and advantages that have been discussed may be achieved independently in various embodiments of the present invention, or may be combined in yet other embodiments, further details of which can be seen with reference to the following description and drawings.

BRIEF DESCRIPTION OF THE SEVERAL VIEWS OF THE DRAWINGS

Figure 1:
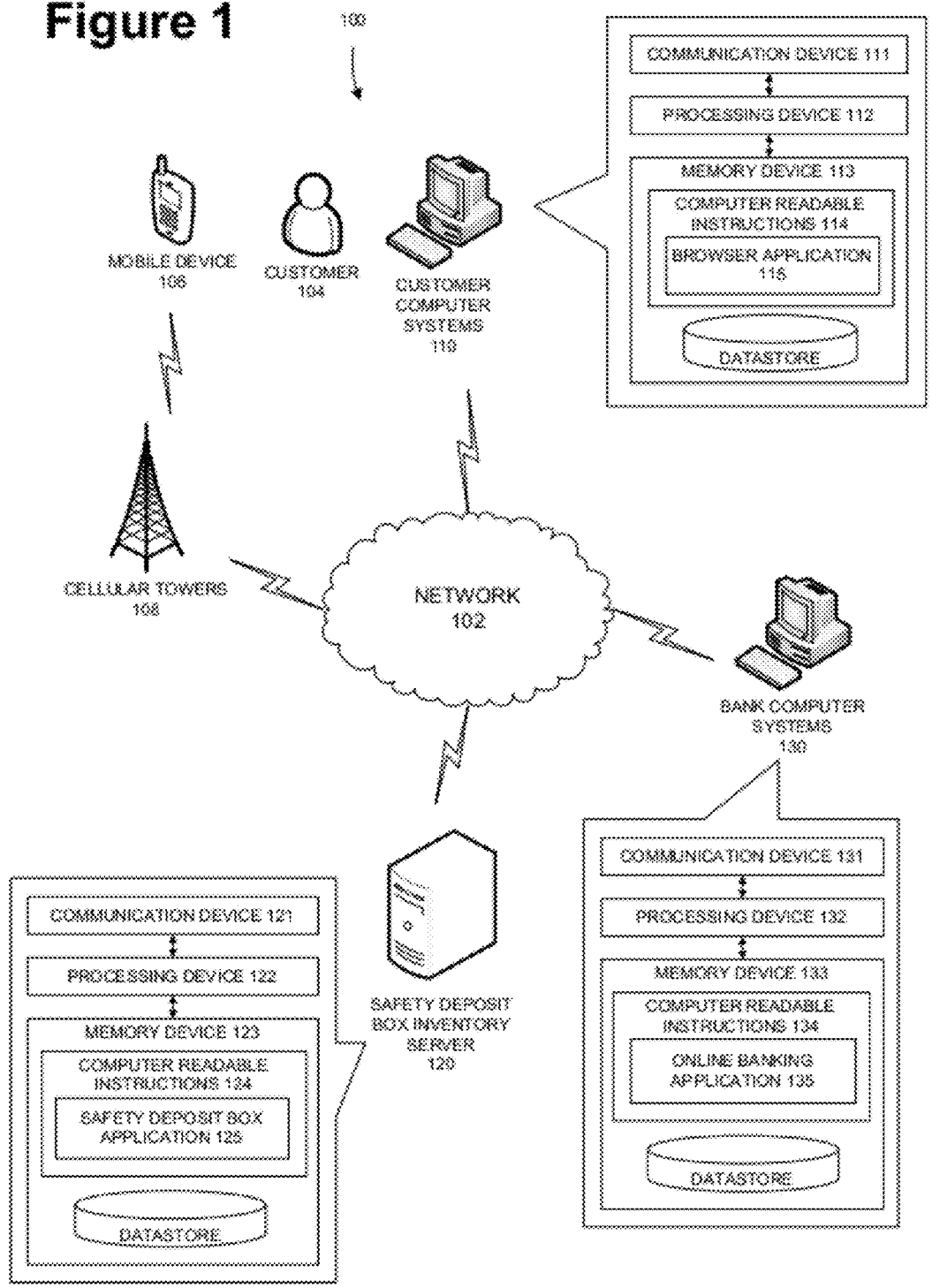
Figure 2:
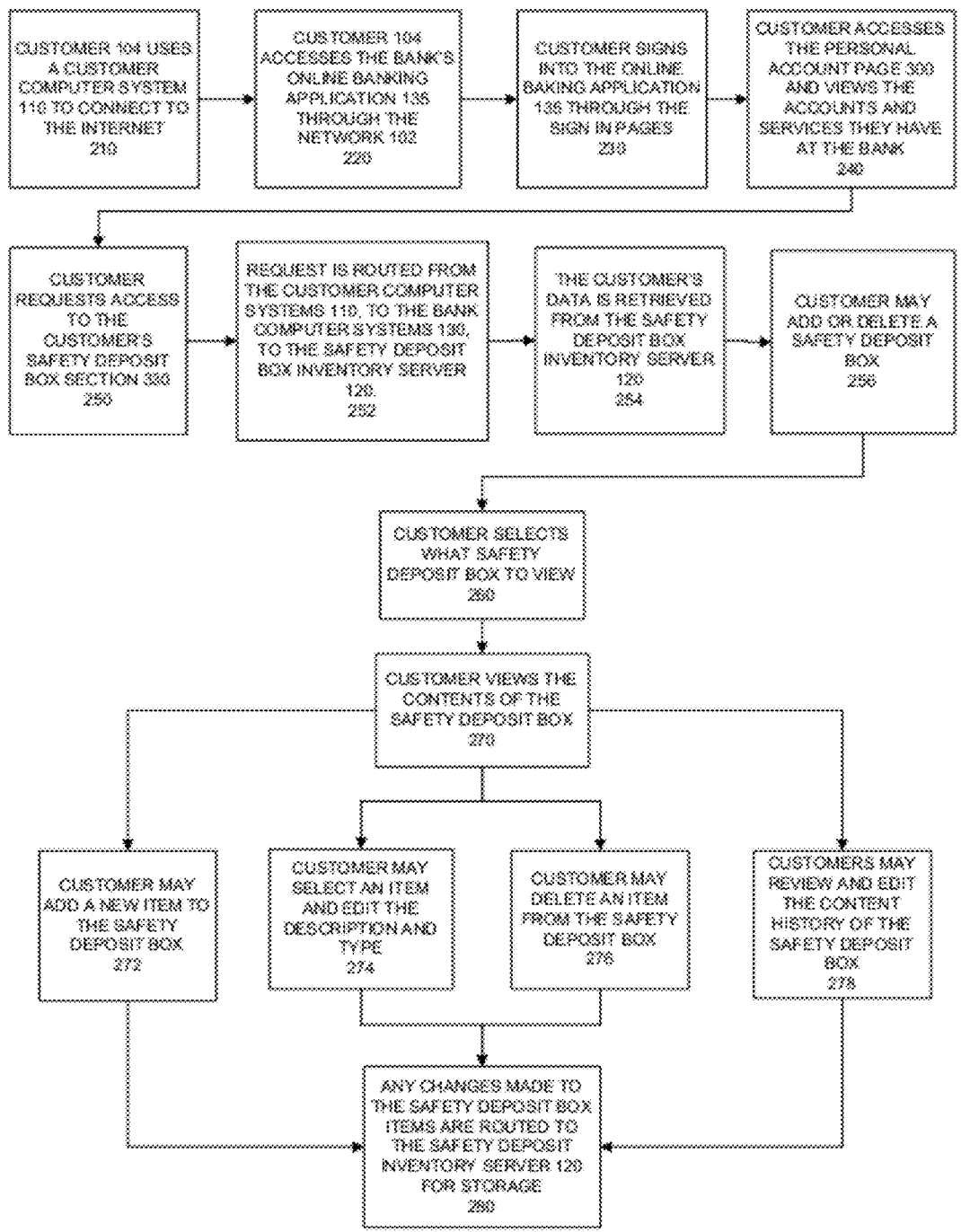
Figure 4:
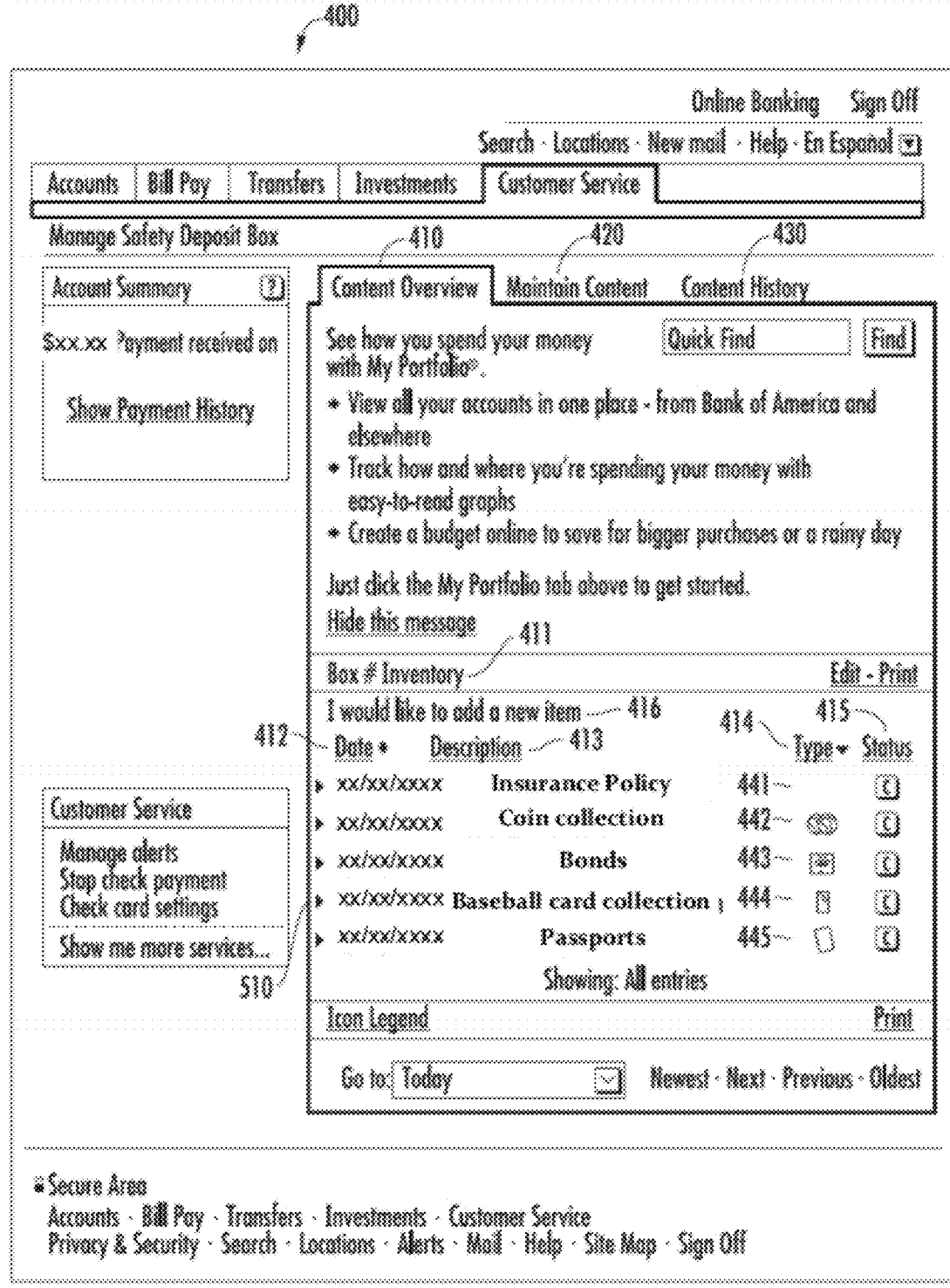
Figure 5:
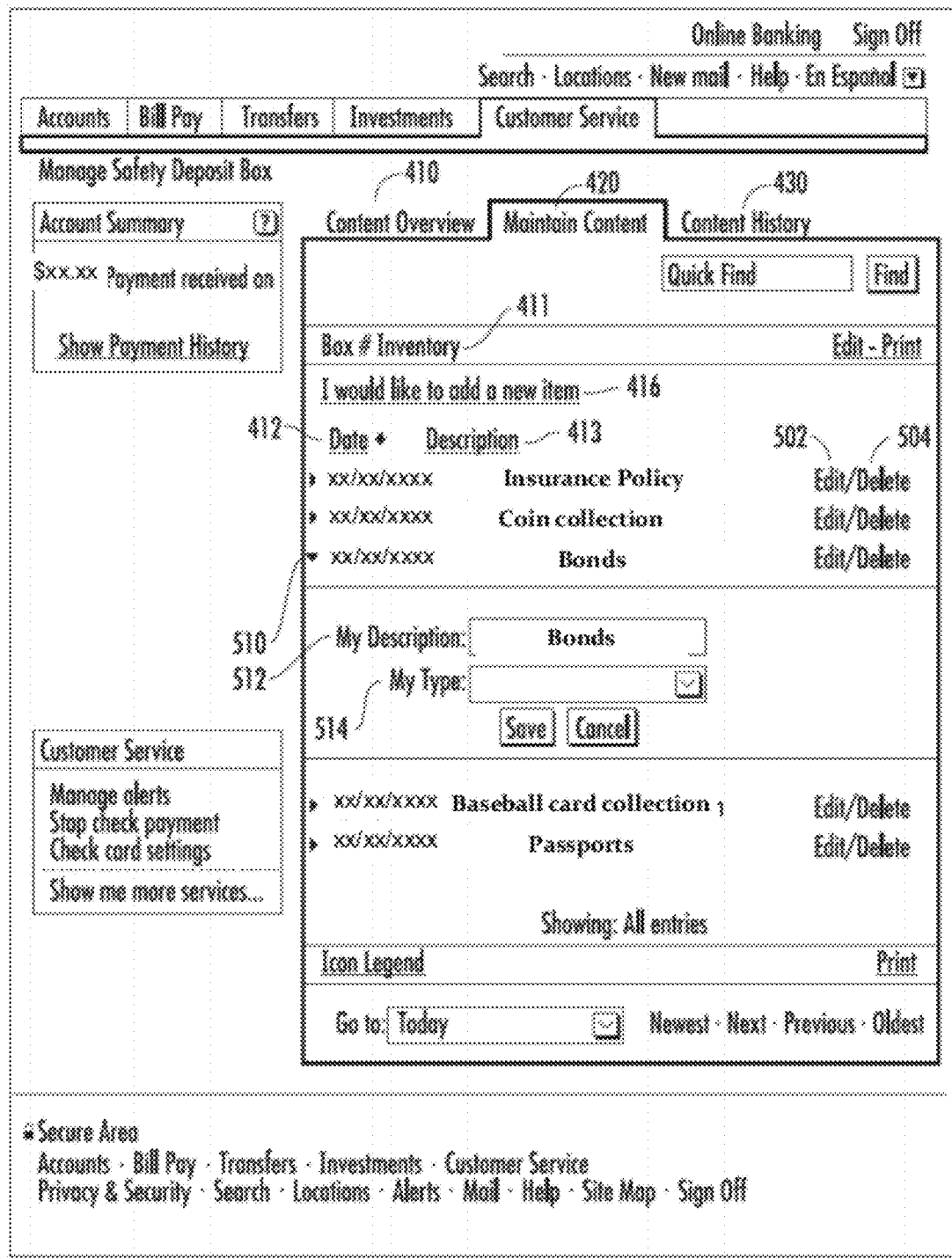

Having thus described embodiments of the invention in general terms, reference will now be made to the accompanying drawings, which are not necessarily drawn to scale, and wherein:

FIG. 1 illustrates a banking environment and safety deposit box inventory system, in accordance with an embodiment of the invention;

FIG. 2 illustrates a flow chart outlining the process when a customer accesses and manages the customer's electronic safety deposit box inventory, in accordance with an embodiment of the invention;

Figure 3:
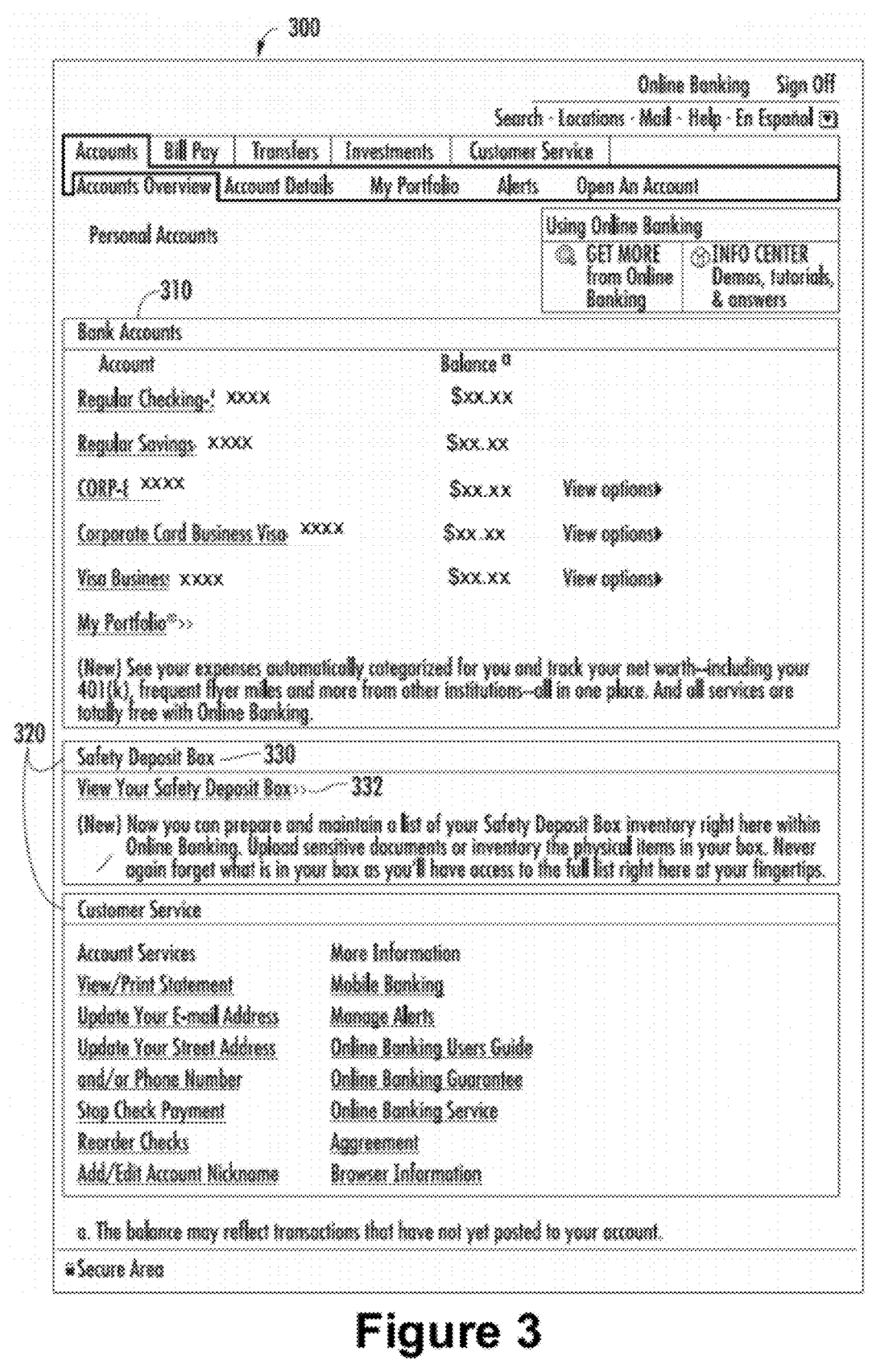

FIG. 3 illustrates the graphical user interface of a customer's personal account home page for managing the customer's accounts, in accordance with an embodiment of the present invention;

FIG. 4 illustrates the graphical user interface of a safety deposit box overview page for reviewing the list of contents of a safety deposit box, in accordance with one embodiment of the invention; and FIG. 5 illustrates the graphical user interface of a safety deposit box maintenance page for managing the list of contents of a safety deposit box, in accordance with one embodiment of the invention.

DETAILED DESCRIPTION OF EMBODIMENTS OF THE INVENTION

Embodiments of the present invention now will be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Although the embodiments of the invention described herein are generally described as involving a "bank," one of ordinary skill in the art will appreciate that other embodiments of the invention may involve other businesses or financial institutions that take the place of, or work in conjunction with, a bank to perform one or more of the processes or steps described herein as being performed by a bank.

As will be appreciated by one of skill in the art, the present invention may be embodied as a method, system, computer program product, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-readable medium may be utilized. The computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), other tangible optical or magnetic storage device; or transmission media such as those supporting the Internet or an intranet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in computer memory.

Embodiments of the present invention are described below with reference to flowchart illustrations and/or block diagrams of methods, apparatuses (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture, including instruction means, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

Embodiments of the present invention further provide a plurality of User Interfaces ("UI") to be displayed using a display device communicatively coupled to a computing device. These UIs are generated and operated by a processor executing computer-readable program instructions embodied in a computer-readable medium. The UIs display the sign-on, overview, and maintenance screens for managing the online safety deposit box inventory system.

FIG. 1 illustrates a banking environment and safety deposit box inventory system 100 in accordance with an embodiment of the present invention. As illustrated in FIG. 1, a customer 104 has access to customer computer systems 110. The customer computer systems 110 are operatively coupled, via a network 102, to a safety deposit box inventory server 120 and bank computer systems 130. In this way the customer computer systems 110 can receive electronic data regarding the customer's 104 accounts and services at the bank. The network 102 may be a global area network (GAN), such as the Internet, a wide area network (WAN), a local area network (LAN), or any other type of network or combination of networks. The network 102 may provide for wireline, wireless, or a combination of wireline and wireless communication between devices in the network.

As illustrated in FIG. 1, the customer computer systems 110 generally comprise a communication device 111, a processing device 112, and a memory device 113. The processing device 112 is operatively coupled to the communication device 111 and the memory device 113. The processing device 112 uses the communication device 111 to communicate with the network 110. As such, the communication device 111 generally comprises a modem, server, or other device(s) for communicating with other devices on the network 102, and a display, mouse, keyboard, microphone, and/or speakers for communicating with one or more users, which include customers. As further illustrated in FIG. 1, the customer computer systems 110 include computer-readable instructions 114 stored in the memory device 113, which include the computer-readable instructions 114 of the browser application 115. The browser application 115 allows the customer 104 to use the network 102 to connect the customer's 104 accounts located on the bank computer systems 130.

The bank computer systems 130 maintain the accounts of and services used by, the bank's customers, which a customer 104 may remotely access through the network 102. The bank computer systems 130 generally comprise a communication device 131, a processing device 132, and a memory device 133. The processing device 132 is operatively coupled to the communication device 131 and the memory device 133. The processing device 132 uses the communication device 131 to communicate with the customer computer systems 110 and the safety deposit box inventory server 120 through the network 102. As such, the communication device 131 generally comprises a modem, server, or other device(s) for communicating with other devices on the network 102. As further illustrated in FIG. 1, bank computer systems 130 contain computer-readable program instructions 134 stored in the memory device 133, which include the computer-readable program instructions 134 for an online banking application 135 through which customers can access and manage their accounts remotely. The memory device 133 also includes one or more datastores that contain information about the account of the bank's customers.

Although FIG. 1 illustrates the bank computer systems 130 as one system, it is important to note that there can be one or multiple systems, each with similar components that control the bank's accounts and services for all of the bank's customers. Furthermore, although FIG. 1 illustrates the bank computer systems 130 as separate from the safety deposit box inventory server 120, in other embodiments the safety deposit box inventory server 120 may be a part of the bank computer systems 130.

The bank computer systems 130 are operatively coupled to the to the safety deposit box inventory server 120 through the network 102. The safety deposit box inventory server 120 generally comprises a communication device 121, a processing device 122, and a memory device 123. The processing device 122 is operatively coupled to the communication device 121 and the memory device 123. The processing device 122 uses the communication device 121 to communicate with the network 102. As such, the communication device 121 generally comprises a modem, server, or other device(s) for communicating with other devices on the network 102. As further illustrated in FIG. 1, the safety deposit box inventory server 120 contains computer-readable program instructions 124 stored in the memory device 123, which includes the computer-readable program instructions 124 for a safety deposit box application 125 to electronically store and manage the information about the contents of a safety deposit box. Although FIG. 1 illustrates the safety deposit box inventory server 120 as one system, it is important to note that there can be one or multiple servers, each with similar components that electronically store and mange the content of a safety deposit box. The memory device 123 also includes one or more datastores that contain information about customers safety deposit box accounts and the content of the safety deposit boxes.

In some embodiments of the invention, the customer computer system 110 is or includes a mobile device 106, such as a mobile telephone, as such, in some embodiments, the customer 104 may access and manage his/her accounts, specifically the customer's safety deposit box inventory, through the bank computer systems 130 and the safety deposit box inventory server 120. A mobile device 106 is operatively coupled to the bank computer systems 130 through cellular towers 108 or other communication devices, and the network 102. A customer 104 may perform all of the tasks related to accessing and managing the customer's accounts and services through the mobile device 106 that the customer performs using other systems.

FIG. 2, illustrates a flow chart outlining a process of how a customer 104 uses the banking environment 100 and safety deposit box inventory system when accessing and managing the customer's safety deposit box inventory. As illustrated in block 210, the customer may use a mobile device 106 or other customer computer systems 110 to connect to a network 102, in this case the internet. A customer 104 using the browser application 115, accesses the bank's online banking application 135, as illustrated by block 220. As illustrated by block 230, a customer 104 will sign into the online banking application 135 using an online ID, sitekey, and passcode. Once in the online banking application 135, the customer 104 may access the personal account page 300 illustrated in FIG. 3, which displays the accounts 310 and services 320 in which the customer has enrolled.

One service which is listed in FIG. 3 is the safety deposit box section 330. A customer may request to access the safety deposit box section 330 by selecting the "view your safety deposit box" link 332 in the personal account page 300, as illustrated by block 250. The safety deposit box section 330 allows the customer 104 to prepare and maintain a list of the customer's safety deposit box inventory within the online banking application 135. As illustrated by block 252, after the customer 104 selects the "view your safety deposit box" link 332, the request is routed from the customer computer systems 110 to the bank computer systems 130. Thereafter the request is routed to the safety deposit box inventory server 120, which is where the customer's 104 safety deposit box section 330 information is stored. The request retrieves the customer's 104 safety deposit box section 330 information from the safety deposit box inventory server 120, and routes the information back to a display on the customer computer systems 110, as illustrated in block 254.

FIG. 4, illustrates the safety deposit box management page 400 that is displayed when a customer 104 selects the "view your safety deposit box" link 332. In some embodiments multiple safety deposit boxes would be displayed when an individual customer 104 owns multiple safety deposit boxes. In one embodiment of the present invention the bank may automatically list the customer's box(es) in the safety deposit box management page 400. Thereafter, the customer may edit the list of inventory in each of the box(es). In other embodiments the customer may create or delete the entries for the safety deposit boxes that the customer owns. For example, the customer may want to list some safety deposit box(es) in the account, while keeping other safety deposit box(es) secret. Therefore, as illustrated in block 256 the customer my add or delete the safety deposit box entries himself without the bank having any control over listing the safety deposit box(es) or the contents. In the case where the customer 104 owns multiple safety deposit boxes the customer 104 would select what safety deposit box to view, as illustrated in block 260.

As illustrated in FIG. 4, the safety deposit box management page 400 displays a "content overview" tab 410, a "maintain content" tab 420, and a "content history" tab 430. As illustrated, the "content overview" tab 410 provides a block for the customer's 104 box # inventory 411. As illustrated in block 270 of FIG. 2, the customer may view the contents of the safety deposit box selected. The customer's box # inventory 411 lists the date 412, the description 413, the type, 414, and the status 415 of all of the customer's contents of the box.

To make changes to the box # inventory 411 the customer selects the "maintain content" tab 420, the "I would like to add a new item" link 416, or the drop-down button 510. Any of these options will bring the user to the "maintain content" tab 420 illustrated in FIG. 5.

As illustrated in block 272 of FIG. 2, a customer may add a new item to the box # inventory 411 by selecting the "I would like to add a new item" line 416. When a new inventory item is added the customer 104 may add the date 412 the item was added, a description 413 of the item, and the type 414 of item. The type 414 of item may include icons and/or names in the online banking application 135 that the customer selects, such as but not limited to, policies 441, coins 442, certificates 443, cards 444, passports 445, etc. In other embodiments, the type 414 of item may include more customized icons and/or names that are created by customers.

As illustrated in block 274 the customer may also edit an item already listed in the box # inventory 411 by selecting the "edit" link 502 or selecting the drop-down button 510. The customer may edit the items by changing the description 512 or the type 514 of the item listed. As illustrated in block 276, the customer may delete an item from the box # inventory 411 by selecting the "delete" link 504 in the "maintain content" tab 420. The customers may also review and edit the content history of the safety deposit box through "content history" tab 430, as illustrated in block 278. The "content history" tab 430 keeps track of the items that were once in the box # inventory 411, but are no longer in the box # inventory 411 because they have been removed by the customer. In some embodiments of the invention, the customer may make notes in the "content history" tab 430 as to why the items were removed from the safety deposit box or where the items are now located. In some embodiments of the invention, the customer may clear the "content history" tab 430 or portions thereof if they choose to do so, in order to prevent anyone from finding out what items were once in the box or the current locations of the items.

As illustrated in block 280 of FIG. 2, any changes made to the safety deposit box items are routed to the safety deposit box inventory server 120 for storage.

The online safety deposit box allows customers to keep track of their safety deposit box(es) and keep a back up copy of their safety deposit box inventories. In the unfortunate event that a safety deposit box customer passes away, becomes disabled, or is otherwise unable to communicate that they even have a safety deposit box, an attorney or guardian who would have control and access over the customer's banking account(s) may, using this system, more easily identify the fact there is one or more safety deposit box(es) and may be able to view a list of the inventory within the safety deposit box. Furthermore, if paper copies are destroyed or lost, both the customer and bank employees will not be inconvenienced by trips to the safety deposit box to determine the contents of the box because a list of the inventory can be kept through the online banking application 135.

Specific embodiments of the invention are described herein. Many modifications and other embodiments of the invention set forth herein will come to mind to one skilled in the art to which the invention pertains, having the benefit of the teachings presented in the foregoing descriptions and the associated drawings. Therefore, it is to be understood that the invention is not to be limited to the specific embodiments disclosed and that modifications and other embodiments and combinations of embodiments are intended to be included within the scope of the appended claims. Although specific terms are employed herein, they are used in a generic and descriptive sense only and not for purposes of limitation.

What is claimed is:

1. A system comprising:
a memory device comprising a computer-readable medium providing computer-readable instructions;
a communication device; and
a processor operatively coupled to the communication device and the memory device, wherein the processor is configured to execute the computer readable instructions to:
receive a request from a user to electronically access an online portal maintained by a financial institution, wherein the online portal allows access to one or more accounts or services associated with the user;
allow the user to access an account that the user has with the financial institution;
allow the user to access a service that the user has with the financial institution, wherein the service is an online safety deposit box that has information about the physical contents of a safety deposit box associated with the online safety deposit box;
receive an input, wherein the input received comprises a date, a description of an item deposited in the safety deposit box, or a type of item deposited in the safety deposit box; and
store the input as information about the physical contents of the safety deposit box in the associated online safety deposit box.

2. The system of claim 1, wherein the user is a customer of the financial institution.

3. The system of claim 1, wherein the processor is configured to execute the computer-readable instructions to allow the user to access information about the physical contents of a plurality of safety deposit boxes associated with the online safety deposit box.

4. A system comprising:
a memory device comprising a computer-readable medium providing computer-readable instructions;
a communication device; and
a processing device operatively coupled to the communication device and the memory device system and configured to execute the computer readable instructions to:
receive a request from a user to electronically access a personal account page maintained by a financial institution, wherein the personal account page allows access to one or more accounts or services associated with the user;

allow the user to access an account that the user has with the financial institution;

allow the user to access a service that the user has with the financial institution, wherein the service is an online safety deposit box that has information about the physical contents of a safety deposit box associated with the online safety deposit box; and use the communication device to provide the user with a graphical user interface, the graphical user interface comprising a tool that allows the user to utilize the personal account page to view, add, edit, delete, or review the information stored about the physical contents of the at least one safety deposit box of the user.

5. The system of claim 4, wherein the information comprises a date, a description of an item deposited in the safety deposit box, or a type of item deposited in the safety deposit box.

6. The system of claim 4, wherein the graphical user interface displays a list of items deposited in the at least one safety deposit box.

7. The system of claim 6, wherein the list comprises a date, a description, and an item type for each item in the list.

8. The system of claim 4, wherein the graphical user interface also allows the user to view or manage information related to the account of the user.

9. A computer program product for a safety deposit box management system, the computer program product comprising a non-transitory computer-readable medium having computer-readable program code portions embodied therein, the computer-readable program code portions comprising:

an executable portion configured for receiving a request from a user to electronically access a personal account page maintained by a financial institution, wherein the personal account page allows access to one or more accounts or services associated with the user;

an executable portion configured for allowing the user to access an account that the user has with the financial institution;

an executable portion configured for allowing the user to access a service that the user has with the financial institution, wherein the service is an online safety deposit box that has information about the physical contents of a safety deposit box associated with the online safety deposit box, and wherein the personal account page is a graphical user interface that allows a user to enter information about the physical contents of the safety deposit box.

10. The computer program product of claim 9, wherein the personal account page is a graphical user interface that allows a user to create a safety deposit box content record and associate it with the account of the user.

11. The computer program product of claim 9, wherein the executable portion configured for allowing the user to access the online safety deposit box comprises a list of the physical contents of the safety deposit box, wherein the list comprises an item description or a predefined item type for each of the physical contents on the list.

12. The computer program product of claim 9, further comprising:

an executable portion configured for allowing the user to use a mobile device to allow the user to access the online safety deposit box.

13. A system comprising:

a memory device configured to store information about one or more items deposited in safety deposit boxes of a plurality of persons;

a communication device configured to communicate with a user computer system via a network; and a processing device operatively coupled to the communication device and the memory device and configured to:

receive user identification information from the user computer system;

identify an online safety deposit box associated with the received identification information;

communicate to the user computer system information about the online safety deposit box, wherein the information is the physical contents of a safety deposit box associated with the online safety deposit box;

communicate to the user computer system information about an account that the user has with a financial institution; and provide the user computer system with a graphical user interface that allows a user of the user computer system to view, add, edit, delete, or review information stored in the online safety deposit box about the one or more items deposited in the associated safety deposit box.

14. The system of claim 13, wherein the processing device is configured to provide a web page displaying the information stored in the online safety deposit box about the one or more items deposited in the associated safety deposit box.

15. The system of claim 13, wherein the processing device is configured to receive user identification information by receiving a user name and a password from the user computer system via the internet.

16. The system of claim 13, wherein the processing device is configured to receive identification information by:

providing the user computer system with a graphical interface to access an online banking portal;

receiving login information from the user computer system, the login information allowing the user computer system to access information about the account and the online safety deposit box through the online banking portal; and wherein the processing device is configured to communicate the information about the physical contents of a safety deposit box associated with the online safety deposit box and the information about the account that the user has with the financial institution via the online banking portal.

17. The system of claim 13, wherein the information about the physical contents of the safety deposit box associated with the online safety deposit box comprises a date that an item in the safety deposit box was added, a description of the item in the safety deposit box, or a type of a item in the safety deposit box.

18. A method implemented by a computerized system configured to manage information about a plurality of safety deposit boxes, the method comprising:

receiving identification information from a user electronically via a network;

retrieving, through the use of a processing device, information stored in a memory device about the physical contents of a safety deposit box associated with an online safety deposit box associated with the identification information;

retrieving, through the use of a processing device, information stored in a memory device about an account associated with the identification information; and electronically communicating to the user the information about the physical contents of the safety deposit box and the account associated with the identification information, wherein the information about the physical contents of the safety deposit box comprises a date that an item in the safety deposit box was added, a description of the item in the safety deposit box, or a type of the item in the safety deposit box.

19. The method of claim 18, wherein electronically communicating to the user the information about the physical contents of the safety deposit box and the account comprises:

provided an online portal over a web page displaying the information about the physical contents of the safety deposit box and the information about the account.

20. The method of claim 18, wherein receiving identification information from a user via a network comprises:

receiving a user name and a password via the internet.

21. The method of claim 18, wherein receiving identification information from a user via a network comprises:

providing the user with a web page to access an online banking portal, and receiving login information from the user, the login information allowing the user to access the online safety deposit box information and the account information of the user through the online banking portal, and wherein the identification information comprises the login information, and wherein electronically communicating to the user the information about the physical contents of the safety deposit box associated with the online safety deposit box associated with the identification information comprises providing the information about the physical contents of the safety deposit box to the user via the online banking portal.

22. The method of claim 18, further comprising:

receiving a request from the user to add information about a new item to the information about the physical contents of the safety deposit box; and storing the information about the new item in the memory device.

23. The method of claim 18, further comprising:

receiving a request from the user to edit or delete information from the information about the physical contents of the safety deposit box; and storing a history of deleted or edited information in the memory device.

24. A computer program product for a safety deposit box management system, the computer program product comprising a non-transitory computer-readable medium having computer-readable program code portions embodied therein, the computer-readable program code portions comprising:

an executable portion configured for receiving a request from a user to electronically access an online portal maintained by a financial institution, wherein the online portal allows access to one or more accounts or services associated with the user;

an executable portion configured for allowing the user to access an account that the user has with the financial institution;

an executable portion configured for allowing the user to access a service that the user has with the financial institution, wherein the service is an online safety deposit box that has information about the physical contents of a safety deposit box associated with the online safety deposit box;

an executable portion configured for receiving an input, wherein the input received comprises a date, a description of an item deposited in the safety deposit box, or a type of item deposited in the safety deposit box; and an executable portion configured for storing the input as information about the physical contents of the safety deposit box in the associated online safety deposit box.

25. The computer program product of claim 24, further comprising an executable portion configured for allowing the user to access information about the physical contents of a plurality of safety deposit boxes associated with the online safety deposit box.

\* \* \* \* \*